(12) United States Patent
Francia (10) Patent No.: US 7,353,750 B2
(45) Date of Patent: Apr. 8, 2008

(54) AUXILIARY SPRINKLING AND RECIRCULATION DEVICE FOR WINE-MAKING TANKS

(75) Inventor: Marco Francia, Casale Monferrato (IT)

(73) Assignee: Gimar Tecno S.R.L., Occimiano (Alessandria) (IT)

( * ) Notice: Subject to any disclaimer, the term of this patent is extended or adjusted under 35 U.S.C. 154(b) by 322 days.

(21) Appl. No.: 10/716,422

(22) Filed: Nov. 20, 2003

(65) Prior Publication Data

US 2004/0149137 A1  Aug. 5, 2004

(30) Foreign Application Priority Data

Nov. 20, 2002 (IT) .......................... TO2002A1012

(51) Int. Cl.
*C12G 1/032* (2006.01)

(52) U.S. Cl. ........................................ 99/277.1; 99/277

(58) Field of Classification Search ................. 99/276, 99/277.1, 277.2, 277; 426/11.15, 592
See application file for complete search history.

(56) References Cited

U.S. PATENT DOCUMENTS

| | | | | |
|---|---|---|---|---|
| 4,652,451 | A | * | 3/1987 | Leedham et al. .............. 426/11 |
| 4,743,451 | A | * | 5/1988 | Kalina ......................... 426/15 |
| 4,969,391 | A | * | 11/1990 | Haulot ...................... 99/277.1 |
| 6,279,457 | B1 | * | 8/2001 | Francia ...................... 99/277.1 |
| 6,805,885 | B2 | * | 10/2004 | Francia ......................... 426/11 |

FOREIGN PATENT DOCUMENTS

| | | |
|---|---|---|
| DE | 101 11 968 A1 | 10/2001 |
| EP | 1 028 162 A2 | 8/2000 |
| EP | 1422289 A1 * | 5/2004 |

* cited by examiner

*Primary Examiner*—Timothy F. Simone
(74) *Attorney, Agent, or Firm*—Sughrue Mion, PLLC (57) ABSTRACT

A sprinkling device, particularly for processes for making wine from red grapes, which can be associated with a fermentation and/or storage tank in order to recirculate the wine must that is being fermented from the base region to the top region of the fermentation tank and to sprinkle the recirculated wine must in a stream into the top region of the fermentation tank, comprises: an auxiliary tank which can be fitted in a hatch or similar top opening of a main tank and which is provided with means for fixing to the hatch, first discharge means for the discharge of the wine must supplied to the auxiliary tank from the main tank, which means comprise a base opening of the auxiliary tank and a closure member which is movable between a closure position and an open position in order to produce a first sprinkling stream of the recirculated wine must, and second discharge means for the discharge of the wine must, which means are associated with the closure member and can discharge the wine must by means of a second sprinkling stream when the level of recirculated wine must in the aux-iliary tank reaches a predetermined level.

19 Claims, 6 Drawing Sheets

AUXILIARY SPRINKLING AND RECIRCULATION DEVICE FOR WINE-MAKING TANKS

BACKGROUND OF THE INVENTION

The present invention relates to a recirculation and sprinkling device to be associated with a fermentation tank or vat, particularly for carrying out processes for making wine from black grapes.

In wine-making, it is widely known to use fermentation tanks or vats which are provided with means for recirculating the wine must that is being fermented from the lower region of the vat to the upper region, with sprinkling of the recirculated wine must onto the layer of marc (known as the head) which is floating on the must contained in the vat.

Apparatus of this type is described, for example, in IT 1 293 978 and U.S. Pat. No. 0,042,443 in the name of the present Applicant, and comprises a tank provided with a separator which defines in the tank a main vat and an upper, secondary vat having associated valve means that are arranged to discharge the wine must periodically from the secondary vat to the main vat in order to sprinkle the layer of marc; a recirculation duct periodically supplies the wine must that is being fermented from the bottom of the main vat to the top of the secondary vat.

Variation of the outlet opening of the valve means associated with the bottom separator or variation of the rules governing the opening and closure movement of the valve means enables the sprinkling stream and the wetting of the marc head to be modulated, improving the extraction of polyphenolic, aromatic, and/or valuable substances contained therein, with substantial benefits to the wine-making product.

Generally, the fermentation apparatus described above is dedicated to wine-making and has considerable dimensions which lead to a fairly high investment cost.

SUMMARY OF THE INVENTION

A primary object of the present invention is to provide an accessory device which enables a conventional storage tank or fermentation vat to be converted into wine-making apparatus that is provided with means for recirculating and sprinkling the recirculated wine must in a stream, thus enabling a wine-making process with recirculation similar to that performed by the above-described apparatus to be performed in a conventional tank—which is generally available in the wine-making industry.

Another object of the invention is to provide a recirculation and sprinkling device which is inexpensive whilst still having a capability for modulation of the sprinkling stream of recirculated wine must.

A further object of the invention is to provide a recirculation and sprinkling device with also permits effective oxygenation of the recirculated wine must.

The above-mentioned objects, and others which will become clear from the following detailed description, are achieved by means of a recirculation and sprinkling device which can be associated with a fermentation tank in order to recirculate the wine must that is being fermented from the base region to the top region of the fermentation tank and to sprinkle the recirculated wine must in a stream into the top region of the tank, and which has the characteristics defined in the appended claims.

BRIEF DESCRIPTION OF THE DRAWINGS

Further advantages and characteristics of the device according to the invention will become clear from the following detailed description that is given with reference to the appended drawings which are provided purely by way of non-limiting example, and in which.

DETAILED DESCRIPTION OF THE INVENTION

In the appended drawings, a recirculation and sprinkling device according to the invention is generally indicated 2; the device comprises a tank 4 (auxiliary tank) which is typically made of stainless steel and the cross-sectional dimensions of which are such that it can be fitted in a hatch or similar top opening 6 of a main fermentation tank, indicated 8.

The tank 4 is fitted in the hatch 6 and fixed therein by fixing elements (not shown) which, naturally, may be arranged and defined according to the specific characteristics of the top opening of the tank with which the device is to be associated.

The tank 4 has a base 10 with an opening 12 (first discharge means) with which valve means are associated; the valve means comprise a closure member 14, typically in the form of a plate, and an operating rod 16. The rod 16 is actuated by an actuator 19, which is preferably electrically operated.

Figure 2:
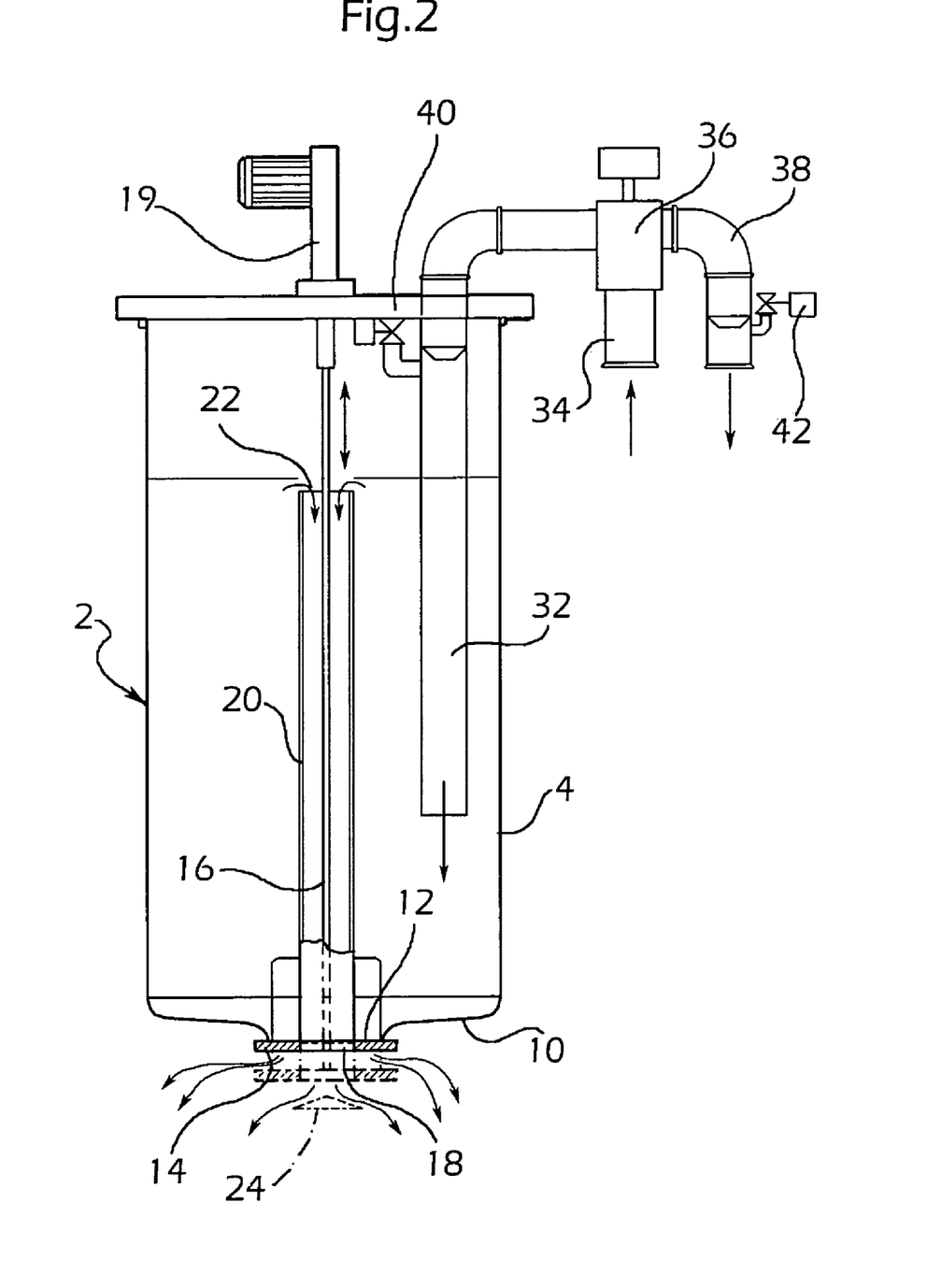
FIG. 2 is a schematic view showing an embodiment of a device according to the invention, in section.

The closure member 14, actuated by the actuator 19, is thus movable between a position of closure of the base opening 12, and an open position, shown in broken outline in FIG. 2, in which it causes a first sprinkling stream of recirculated wine must to be delivered into the main tank 8.

The use of an electric actuator enables the opening position of the valve means to be determined precisely and also permits adjustment of the degree of movement of the closure member 14 between predetermined opening positions or between the fully-open position and the closure position so that the flow-rate and the shape, particularly the width, of the stream sprinkled onto the marc head can be varied.

According to another characteristic of the invention, the device 2 comprises second discharge means for the wine must contained in the auxiliary tank 4; the second discharge means are associated with the valve means hereinbefore de-scribed and, in particular, with the closure member 14.

The second discharge means comprise an opening 18 (second discharge means) in the plate-like closure member 14, communicating with a tubular over-flow duct 20 which, in the embodiment illustrated, surrounds the rod 16. When the wine must inside the tank 4 reaches the level of the mouth 22 at the top of the tubular duct 20, the wine must flows through the duct 20 and is discharged into the tank 8 in a second sprinkling stream through the opening 18.

A diffuser member 24 is preferably connected to the closure member 14, beneath the opening 18, and has a surface, preferably a conical surface, which is struck by the stream of wine must emerging from the opening 18, so that the stream is spread out like an umbrella.

In a preferred embodiment, the diffuser member 24 is frusto-conical at the top with an aperture 24a, which by way of a non-limiting example, may be central, so as to be permeable to allow a local flow.

The distance between the diffuser member 24 and the opening 18 may also be adjustable so that the radial aperture of the stream can consequently be varied.

Figure 3:
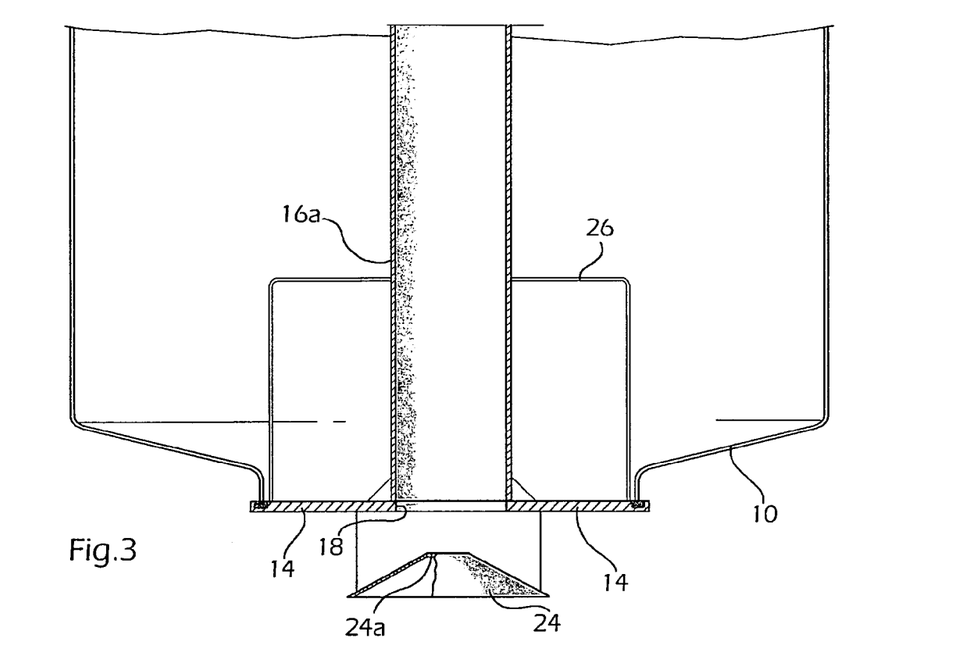
FIG. 3 is a view showing a detail of the device according to the invention, in section.

In another embodiment shown schematically in FIG. 3, there is provision for the use of a tubular rod 16a connected to the plate 14 and having the same function as the overflow duct 20; for this purpose, the rod therefore has radial openings in its wall, at a predetermined distance from the plate 14; these openings permit a flow of the wine must inside the rod and the delivery of a stream through the opening 18. In this case, the tubular rod 16a is connected directly to the actuator member 19.

The rod 16a and the overflow duct 20 may have associated vortex-breaking and centring members 26 adjacent the closure member 14, for example, in a crossed arrangement and constituted, for example, by rods and/or sheet-metal walls.

Figure 1:
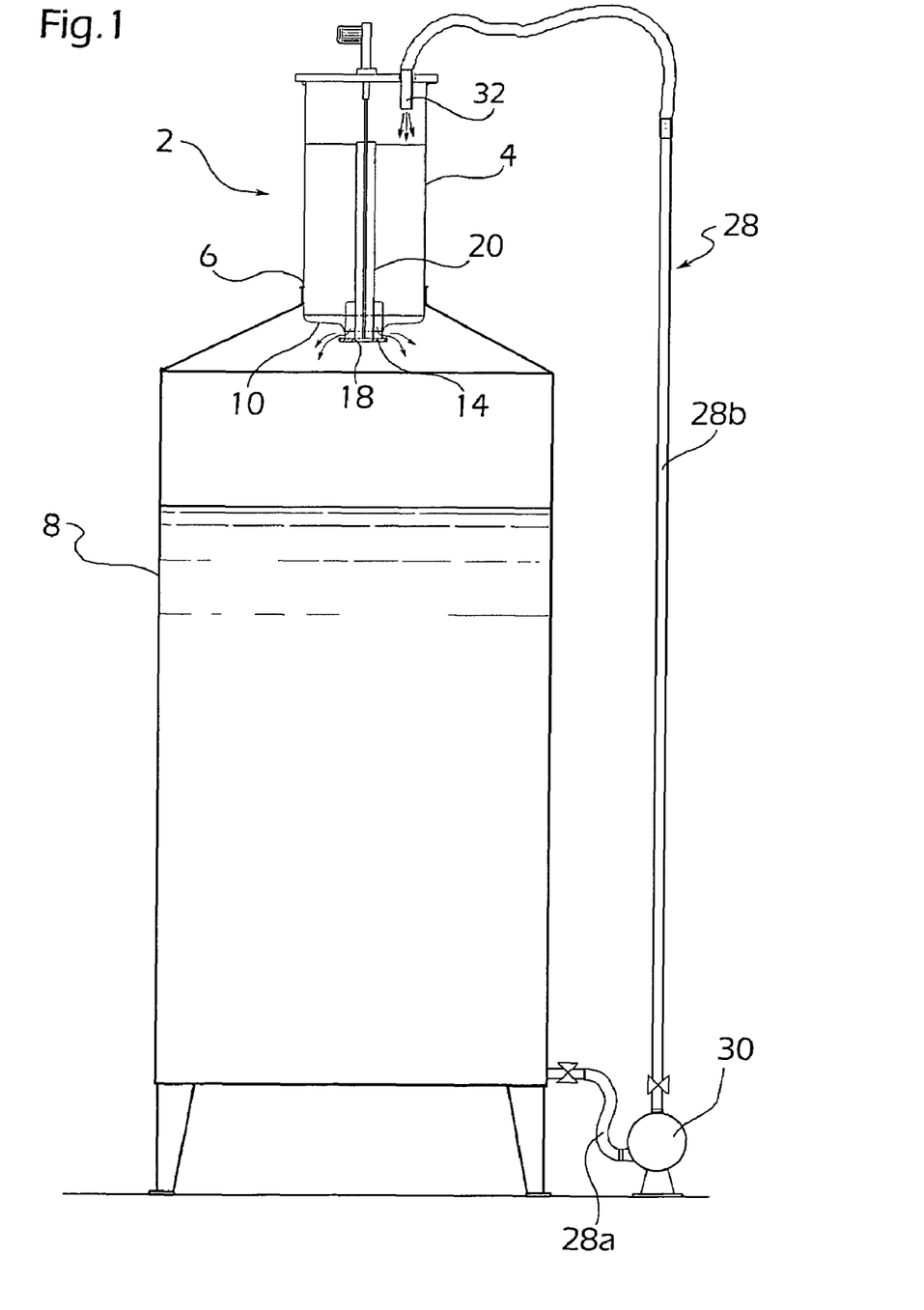
FIG. 1 is a partially-sectioned, schematic, front elevational view of a fermentation tank with an associated recirculation and sprinkling device according to the invention.

In the simplest embodiment, shown in FIG. 1, the recirculation and sprinkling device 2 according to the invention is associated with the upper hatch of a tank 8; the end portion of a recirculation duct 28 is fixed inside the device 2; the duct 28 optionally has flexible portions and comprises an intake portion 28a which draws off the wine must in the vicinity of the base of the main tank 8 and a delivery portion 28b, between which a pump 30 is interposed.

When, in the course of the fermentation process, it is desirable to perform must-recirculation stages, the operator arranges for the pump 30 to be operated in order to supply the wine must into the tank 4 of the device 2.

When the wine must inside the tank 4 reaches the overflow level, it is delivered in a stream through the opening 18. Another sprinkling stream can be obtained by moving the closure member 14 to the open position; the width of this second sprinkling stream can also be varied by movement of the actuator 19 between predetermined positions of opening of the closure member 14 or between the closure position and the fully-open position, in accordance with predetermined rules governing the variation of its movement.

To enable two distinct sprinkling streams to be emitted, the pump 30 is thus preferably able to deliver a flow of wine must such that it is possible to maintain a level of wine must in the tank 4 such as to permit a separate flow through the overflow duct 20, even when the closure member 14 is in an open position.

The device according to the invention thus enables a high degree of operational flexibility to be achieved in the overall variation of the sprinkling stream.

In a preferred embodiment shown in FIG. 2, a duct 32, which is the outlet of a recirculation duct 28 feeding the tank 4, is associated with the tank 4 of the device 2. Said duct 32 may have a connector 34 which can be connected to a recirculation duct of the type 28. The duct 32 and the connector 34 are preferably connected by a three-way valve 36 to which a further, outlet duct 38 is connected.

The three-way valve 36 enables the recirculated wine must to be supplied selectively to the duct 32 or to the duct 38 which enables the recirculated wine must to be delivered directly into the tank 8, bypassing the device 2, by means of an optional auxiliary duct connected to the duct.

Oxygenation means 40, for example, of the injector type as described in IT 1 293 978, may be associated with the duct 32 in order to admit a flow of oxygenating air into the recirculated wine must. Similar oxygenation means 42 may be associated with the outlet duct 38 for the oxygenation of the wine must that is readmitted directly to the main tank 8.

The duct 32 preferably extends inside the tank 4 to the vicinity of the base 10 and in any case is inserted in the tank in a manner such that its delivery opening is arranged at a distance from the base which is less than the distance of the inlet opening 22 of the overflow duct 20 from the base. When the tank 4 contains a head of wine must which is delivered by the overflow duct 20, the admission of a stream of recirculated wine must, aerated by the oxygenation means 40, thus gives rise to a region of turbulence or bubbling of the oxygenating air in the head of wine must and improves the efficiency of the oxygenation process.

As indicated above, the device according to the invention can be associated with a conventional fermentation tank or vat, provided that it has an upper hatch or opening in which the device can be fitted.

Figure 9:
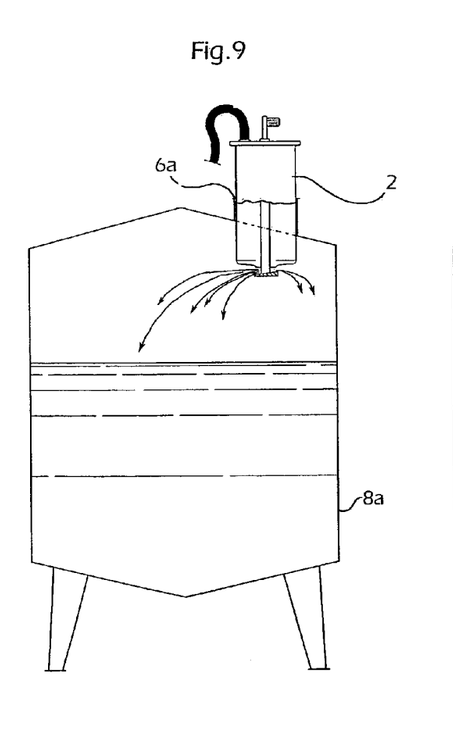
FIGS. 9 and 10 are schematic front elevational views of fermentation tanks or vats with which a device according to the invention, particularly according to the embodiments of FIGS. 4, 5, 6, 7 and 8 is associated.
Figure 10:
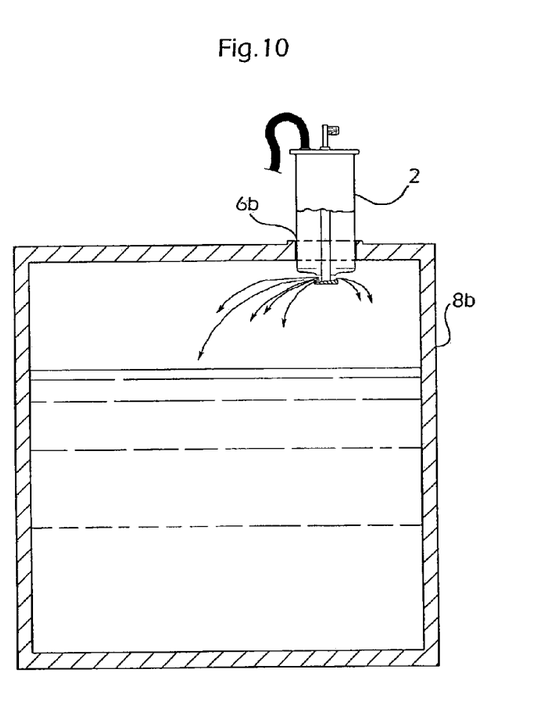

A further advantage of the device according to the invention is that it also enables tanks or vats having hatches or similar openings that are arranged in out-of-centre positions such as, for example, those shown in FIGS. 9 and 10, to be converted into fermentation apparatus with recirculation and sprinkling.

FIG. 9 relates to a cylindrical tank with a side hatch 6a and FIG. 10 relates to a vat, for example, made of concrete, with a rectangular cross-section in plan and provided with a side hatch 6b.

In this case, effective sprinkling of the recirculated wine must over the entire surface of the wine must and in particular onto the floating head can be achieved with the use of a device 2 as described above, but provided with a closure member of the type shown in FIGS. 4, 5, 6, 7 or 8.

Figure 4:
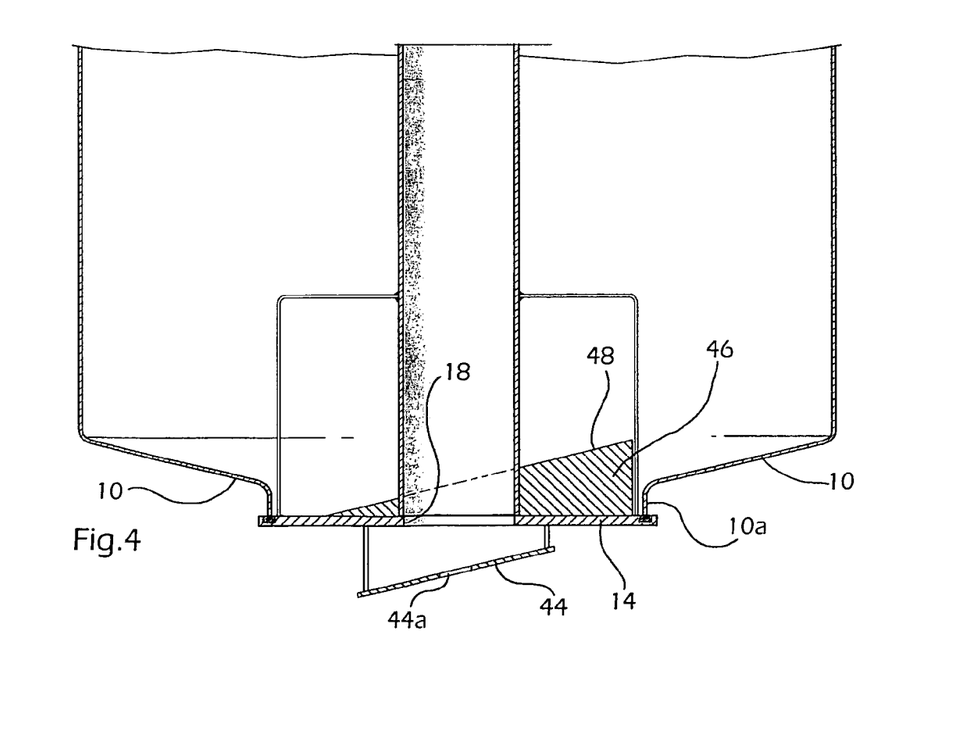
FIGS. 4, 5 and 6 are schematic views showing, in section, a detail of the device of the invention, according to embodiments which are intended particularly for use with fermentation tanks or vats having an out-of-centre upper opening or hatch.

In the embodiment of FIG. 4, a wedge-shaped body 46 is associated with the plate-like closure member 14, on the side facing towards the interior of the tank 4, and has an upper inclined surface 48 and a side wall 46 which extends parallel to a wall 10a that delimits the base opening 12 of the tank 4.

In this embodiment, movement of the closure member 14 to the open or partially open position gives rise to an asymmetric flow with preferential orientation of the sprinkling stream in a lateral position. Naturally, the shape and/or inclination of the surface 48 can be varied in order to give rise to a directional sprinkling flow, according to the position of the device 2 inside the tank for which it is intended.

Other solutions suitable for producing an asymmetric and oriented sprinkling stream provide for the use of a plate-like closure member which is articulated laterally to the base 10 of the tank, or a plate connected to an operating rod and having a peripheral profile which projects asymmetrically relative to the peripheral profile of the base opening 12.

Figure 5:
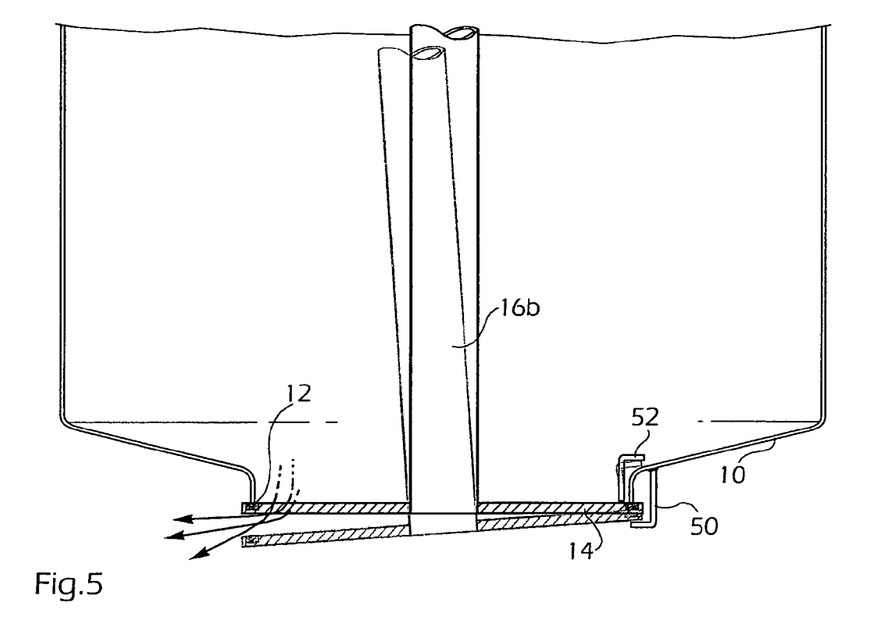

As shown in FIG. 5, the aperture run of the plate closure member 14 is limited by means of a stopping device of the type 52 or of type 50, jointly connected respectively to said plate 14 or to the base of the tank 4. Said stopping device is located at a site diametrically opposite to the direction of the prevailing flow, which is desired during the discharge of the tank 4. The stopping devices 52 or 50 may be provided with adjusting means, so as to allow to modify the extent of the aperture run in the area of the lower aperture of the plate 14.

Figure 6:
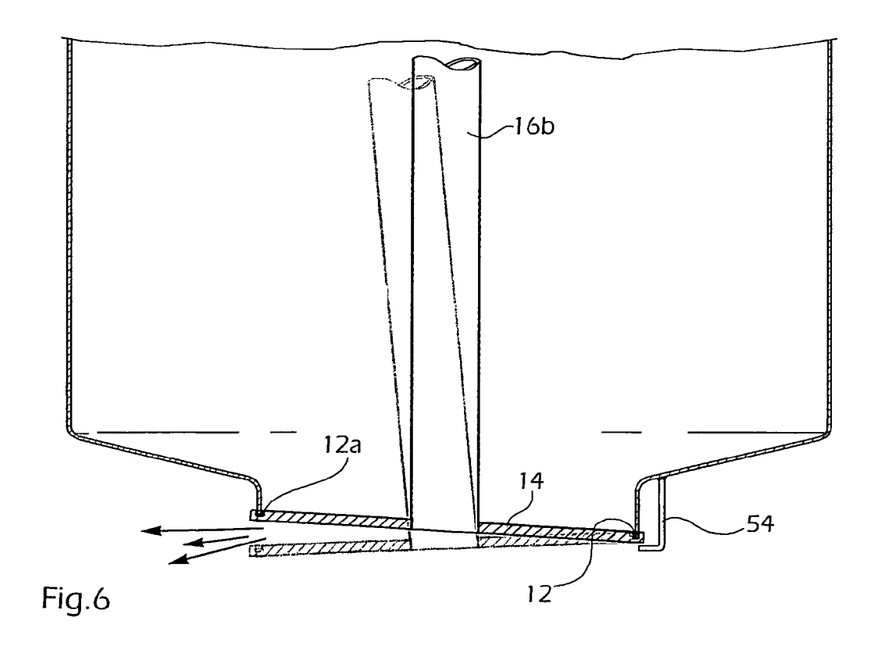

In the embodiment of FIG. 6, a lateral sprinkling stream is obtained by means of a base opening 12 having a mouth profile 12a lying in plane which is inclined with respect to the vertical direction. The plate closure member 14 is connected to a rod 16b, which is tilting with respect to the vertical direction and stopping means 54 are optionally provided to limit the aperture of the closure member.

The stopping means 54 may be provided with adjusting means, so as to allow to modify the extent of the run in the area of the lower aperture of the plate 14.

Figure 7:
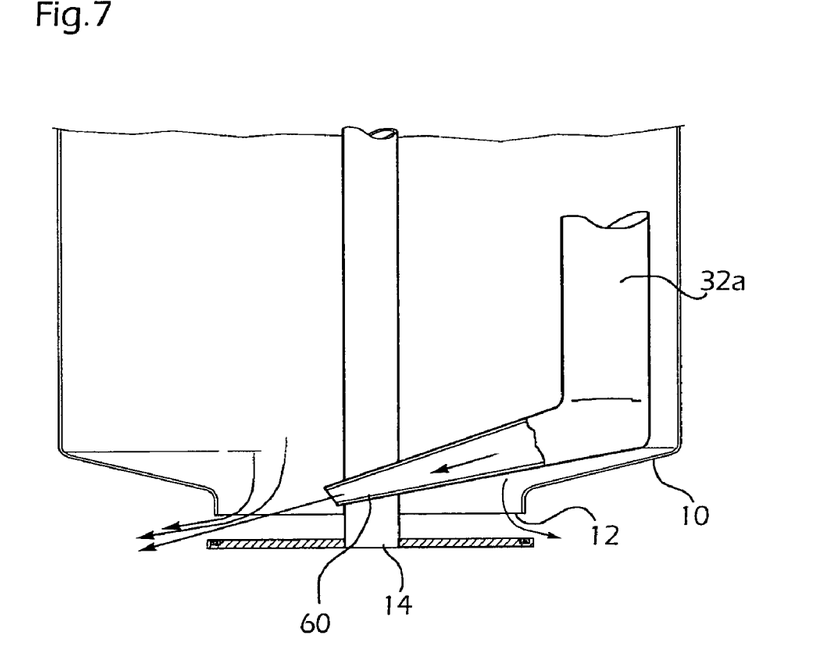
FIGS. 7 and 8 are schematic views, respectively a front cross-section and a view from the top of a structural detail according to another embodiment of the device.
Figure 8:
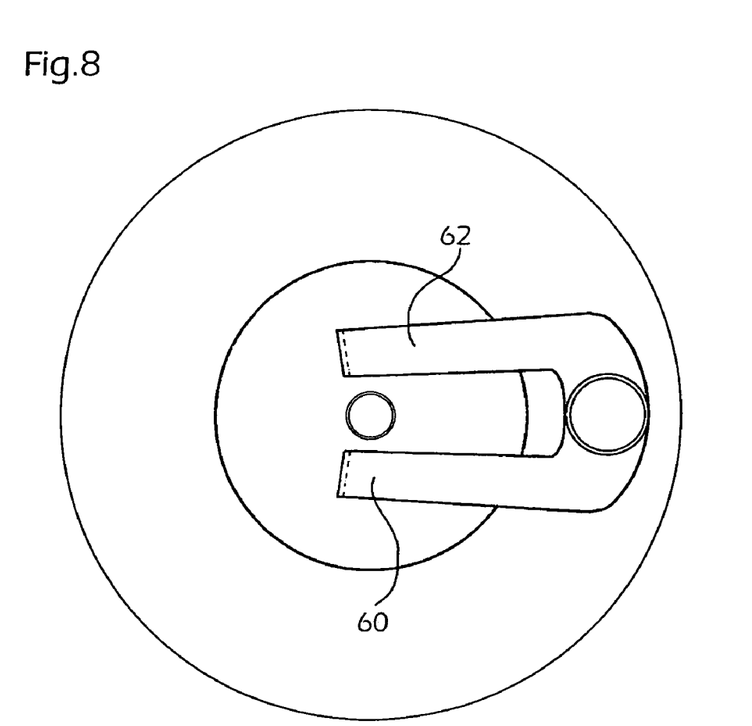

According to another embodiment shown in FIGS. 7 and 8, a further possibility to obtain a directional sprinkling stream contemplates the use of supply duct 32a, which may be connected to a duct for recirculation of the wine must, for instance to the recirculation duct 28 or to the three way valve means 36, provided with one or more end nozzles 60, 62, the outlet of which is adjacent to the base opening 12 of the tank. Said nozzles are adapted to supply one or more streams of recirculated wine must with a jet oriented according to pre-determined directions through the base opening 12 of the tank when the closing member is open. Thus, directional streams of the recirculated wine must are obtained with an additional entraining effect on the discharge flow of the wine must accumulated in the tank.

In all the above-described cases, a diffuser member 44 (FIG. 4), for example, with an inclined surface, may be fitted beneath the closure member 14 in order also to give rise to a lateral, directional delivery flow for the sprinkling stream emitted from the opening 18.

Similarly to the case relating to diffuser member 24 of FIG. 3, in a preferred embodiment, said diffuser member 44 may have an aperture 44a, which by way of non-limiting example, may be central, so as to be permeable to allow a localised stream of the wine must.

Naturally, the principle of the invention remaining the same, the details of construction and forms of embodiment may be varied widely with respect to those described and illustrated by way of non-limiting example.

Again by way of non-limiting example, the apparatus may also be controlled and monitored by means of automatic control and programming systems, rather than manually by an operator.

What is claimed is:

1. A sprinkling device for making wine from grapes, which device is associated with a fermentation tank in order to recirculate wine must that is being fermented from a base region to a top region of the fermentation tank and to sprinkle the recirculated wine must in a stream into the top region of the fermentation tank, said sprinkling device comprising:

an auxiliary tank fitted in a top opening of the fermentation tank and which is provided with means for fixing to a hatch, first discharge means for discharging the wine must that is supplied to the auxiliary tank from the fermentation tank, said first discharge means comprising an opening in a base of the auxiliary tank and a closure member which is movable between a closure position and an open position in order to produce a first sprinkling stream of the recirculated wine must, and second discharge means for discharging the wine must, said second discharge means being associated with the closure member and can discharge the wine must by means of a second sprinkling stream when the level of recirculated wine must in the auxiliary tank reaches a predetermined level, wherein the second discharge means comprise an auxiliary discharge opening in the closure member and an overflow duct communicating with the auxiliary discharge opening in order to deliver the recirculated wine must through the auxiliary discharge opening.

2. A sprinkling device according to claim 1, wherein said auxiliary tank comprises associated supply means for the recirculated wine must, the supply means being connectible to a recirculation duct which draws off the wine must from the fermentation with which the device is associated.

3. A sprinkling device according to claim 2, wherein said supply means comprise a supply duct connectable to said re-circulation duct, having one or more end nozzles suitable to supply one or more streams of recirculated wine must with a jet oriented according to pre-determined directions through the base opening of the tank, when the closure member is open.

4. A sprinkling device according to claim 1, wherein the first discharge means can be operated in order to modulate the head of wine must in the tank in order to determine the width and characteristics of the sprinkling stream.

5. A sprinkling device according to claim 4, wherein the first discharge means are actuated by an electric actuator.

6. A sprinkling device according to claim 1, wherein the closure member includes a plate having, on a side facing towards an interior of the auxiliary tank, an inclined wall for producing an asymmetric, directional sprinkling stream through the base opening of the auxiliary tank.

7. A sprinkling device according to claim 1, wherein the closure member includes a plate articulated laterally to a wall delimiting the base opening and a rod-like operating member which can bring about inclined angular opening of the plate to produce an asymmetric, directional sprinkling stream.

8. A sprinkling device according to claim 1, wherein the closure member of the first discharge means is a plate connected to an operating rod, the plate having a peripheral profile which projects asymmetrically beyond the peripheral profile of the base opening in order to produce an asymmetric, directional sprinkling stream.

9. A sprinkling device according to claim 1, wherein said the base opening of said auxiliary tank has a mouth profile lying in an inclined plane with respect to a vertical and closure member is a plate connected to an operating rod which can be inclined with respect to the vertical.

10. Fermentation apparatus comprising the fermentation tank and the sprinkling device according to claim 1, associated with the top opening of the fermentation tank.

11. Fermentation apparatus according to claim 10, the top opening is positioned in an asymmetric position.

12. Fermentation apparatus according to claim 10, comprising recirculation means which are arranged to draw off the wine must from the base region of the main fermentation tank or vat and to supply the wine must into the sprinkling device.

13. Fermentation apparatus according to claim 12, wherein the recirculation means comprise pumping means arranged to supply to the sprinkling device a recirculation flow rate such as to produce the second sprinkling stream through the second discharge means even when the first discharge means are in the open position.

14. A sprinkling device for making wine from grapes, which device is associated with a fermentation tank in order to recirculate wine must that is being fermented from a base region to a top region of the fermentation tank and to sprinkle the recirculated wine must in a stream into the top region of the fermentation tank, said sprinkling device comprising:

an auxiliary tank fitted in a top opening of the fermentation tank and which is provided with means for fixing to a hatch,     first discharge means for discharging the wine must that is supplied to the auxiliary tank from the fermentation tank, said first discharge means comprising an opening in a base of the auxiliary tank and a closure member which is movable between a closure position and an open position in order to produce a first sprinkling stream of the recirculated wine must, and     second discharge means for discharging the wine must, said second discharge means being associated with the closure member and can discharge the wine must by means of a second sprinkling stream when the level of recirculated wine must in the auxiliary tank reaches a predetermined level,     wherein the second discharge means comprises an auxiliary discharge opening and a diffuser member which is associated with the auxiliary discharge opening and which can interfere with the sprinkling stream coming from the opening in order to modify the shape of the stream.

15. A sprinkling device according to claim 14, wherein the diffuser member comprises a member with a conical surface associated with the closure member beneath the auxiliary opening.

16. A sprinkling device according to claim 14, wherein the diffuser member comprises an inclined plate, associated with the closure member beneath the auxiliary opening and suit-able for producing a directional sprinkling stream.

17. A sprinkling device for making wine from grapes, which device is associated with a fermentation tank in order to recirculate a wine must that is being fermented from a base region to a top region of the fermentation tank and to sprinkle the recirculated wine must in a stream into the top region of the fermentation tank, said sprinkling device comprising:

an auxiliary tank fitted in a top opening of the fermentation tank and which is provided with means for fixing to a hatch,     first discharge means for discharging the wine must that is supplied to the auxiliary tank from the fermentation tank, said first discharge means comprising an opening in a base of the auxiliary tank and a closure member which is movable between a closure position and an open position in order to produce a first sprinkling stream of the recirculated wine must, and     second discharge means for discharging the wine must, said second discharge means being associated with the closure member and can discharge the wine must by means of a second sprinkling stream when the level of recirculated wine must in the auxiliary tank reaches a predetermined level,     wherein said auxiliary tank comprises associated supply means for the recirculated wine must, the associated supply means being connectible to a recirculation duct which draws off the wine must from the fermentation tank with which the device is associated; and     wherein the associated supply means comprise three-way valve means with an inlet connector connectible to the recirculation duct, a first outlet duct which supplies the recirculated wine must into the auxiliary tank through the valve means, and a second outlet duct which is arranged to be connected to a duct for supplying the recirculated wine must to the fermentation tank, the valve means being arranged to supply the recirculated wine must selectively to the first outlet duct or to the second outlet duct.

18. A sprinkling device according to claim 17, comprising oxygenation means, associated with the first outlet duct and/or with the second outlet duct, for oxygenating the recirculated wine must.

19. A sprinkling device according to claim 18, wherein the oxygenation means comprise air-injection means.

* * * * *